No. 698,726. Patented Apr. 29, 1902.
W. McCAUSLAND.
VEHICLE TIRE.
(Application filed Jan. 18, 1901. Renewed Oct. 8, 1901.)
(No Model.)
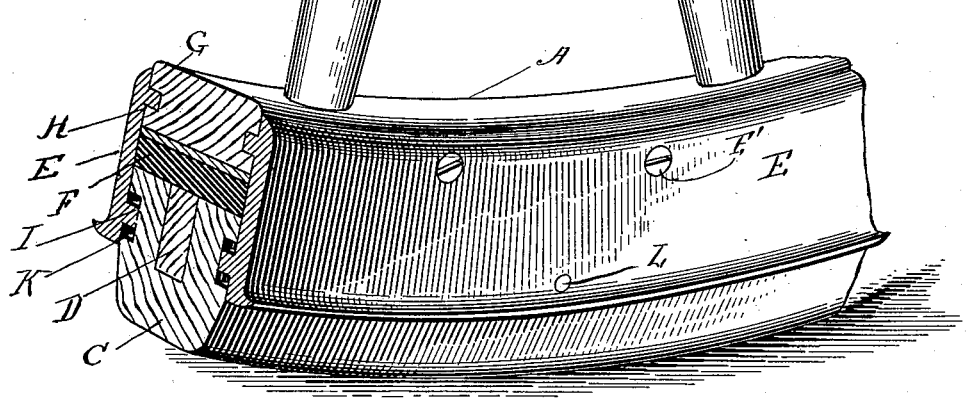
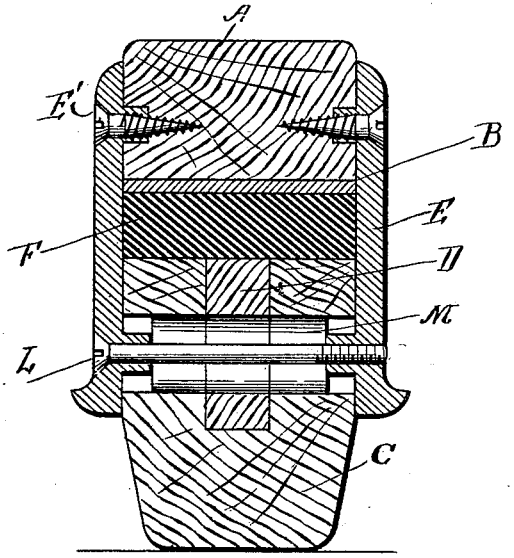 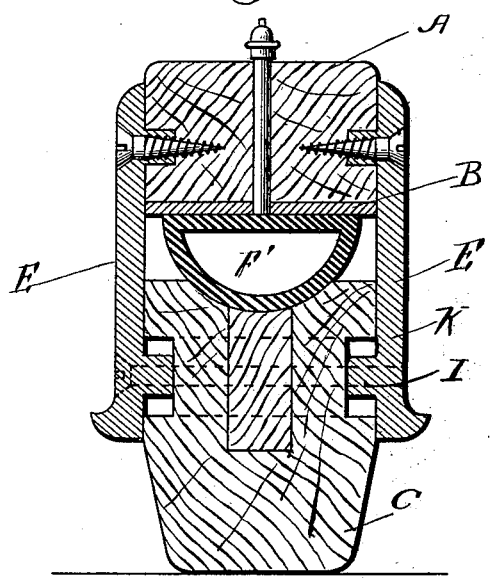
Witnesses
J. C. Shaw.
Clarence Shaw.
Inventor
Wm. Mc. Causland,
By O'Maratta
Attorneys

UNITED STATES PATENT OFFICE.

WILLIAM McCAUSLAND, OF NEW YORK, N. Y.

VEHICLE-TIRE.

SPECIFICATION forming part of Letters Patent No. 698,726, dated April 29, 1902.

Application filed January 18, 1901. Renewed October 8, 1901. Serial No. 78,010. (No model.)

*To all whom it may concern:*

Be it known that I, WILLIAM MCCAUSLAND, a citizen of the United States, residing at New York city, in the State of New York, have invented a new and useful Vehicle-Tire, of which the following is a specification.

This invention is an improved construction of cushion-tire for vehicles of all kinds, the object being to provide a simple and durable form of cushion-tire which will remedy the defects of those tires now in use. Cushion-tires now in use are either pneumatic or a solid-rubber cushion applied to the exterior of the wheel-rim. The pneumatic tire is liable to puncture and the cushion-tire rapidly wears away.

My invention is intended to avoid these inconveniences; and it consists, essentially, in arranging a wooden tire, in combination with a cushion, upon the ordinary vehicle-wheel.

The invention consists also in so constructing and arranging the parts as to secure the greatest amount of elasticity and at the same time a maximum amount of strength and durability.

The invention consists also in the peculiar construction of the various parts and in their novel combination and arrangement, all of which will be described hereinafter, and particularly pointed out in the claims.

In the drawings forming a part of this specification, Figure 1 shows a portion of a wheel having my improved cushion-tire attached thereto. Fig. 2 is a transverse sectional view of the tire, and Fig. 3 is a similar view showing a slight modification.

Referring to the drawings, A indicates an ordinary wheel-rim or felly having the usual construction of flat metal tire B attached thereto in any suitable manner. The tire proper, C, is of wood, and in practice I prefer to make this tire of strong hard wood, the tire being made in sections turned to fit the rim of the wheel and end grain—that is, the grain running parallel with the depth of the tire. As before stated, these sections or segments are turned and are connected with each other in the usual or any approved manner, and in addition to the usual connection at each end I propose to have a central connecting-strip D, which is located in a central groove or recess cut in the inner face of the tire, the grain of the wood of said ring or strip running around or parallel with the said strip, and consequently at an angle to the grain at the tire proper. This central strip or ring of wood greatly increases the strength of the tire and prevents splitting.

The tire C is held in place upon the wheel-rim by means of metallic plates E, and between the tire and the wheel-rim is interposed a cushion F, which may be a solid strip of rubber, as shown in Figs. 1 and 2, or a pneumatic cushion, as shown at F' in Fig. 3. The plates E are secured to the sides of the wheel-rim A by means of suitable screws or bolts E'; but in order to relieve said bolts or screws of a great deal of the strain I propose to construct the plates with inwardly-projecting ribs or beads G, which enter and fit into the grooves H, turned into the sides of the wheel-rim A. The outer ends of the plates E are also constructed with inwardly-projecting ribs or beads I, which fit into the grooves K, cut in the sides of the tire C, and it will be noted that these grooves K are somewhat wider than the width of the ribs or beads I, thus enabling the tire to yield or cushion upon the rubber F. A safety-bolt L is passed through the plates adjacent to their outer ends in order to receive any severe strain placed upon the tire; but it will be noted that said tire is bored out, as shown at M, where the bolt passes through, in order to permit the tire to yield or cushion readily, and the bolt L has no special function except to prevent the spreading of the plates and to take up any unusual strain which is placed upon the tire C.

It will thus be seen that I have constructed a wooden tire composed of a series of segments turned with the end grain and also strengthened said wooden tire by means of a central strip or ring, and a tire constructed in this manner is manifestly more durable than a pneumatic or solid-rubber cushion. By connecting a tire constructed in this manner by means of plates such as I have described and by interposing a cushion between the wooden tire and the wheel-rim it will be noted that I have secured all the advantages of the ordinary cushion-tire now in use and at the same time eliminated all of their defects. In Fig. 3 I have shown a pneumatic cushion F'; but it will of course be understood that this could be a solid-rubber cushion semicircular in shape, and whenever a semicircular shape is employed I prefer to groove out the inner face of the tire C in order to form a seat for said curved cushion.

Having thus fully described my invention, what I claim as new, and desire to secure by Letters Patent of the United States, is—

1. The combination with a wheel-rim having grooves in the sides, of the metallic plates secured to the wheel-rim and having inwardly-projecting ribs or beads adjacent to their inner and outer ends, the wooden tire having grooves in its sides, said grooves being of a width greater than the width of the ribs or beads, the interposed cushion between the rim and tire, and the safety-bolts passing through the plates, and also through the wooden tire, substantially as described.

2. A wheel-tire composed of wood made in sections turned with the end grain and having a central strip or ring also of wood, the grain of which extends in a direction different to the grain of the wooden tire, substantially as shown and described.

3. The combination with a wheel-rim grooved as described, of a wooden tire having a reinforcing central portion and also grooved upon the sides, the metallic plates having inwardly-projecting ribs or beads, the interposed cushion between the wheel-rim and wooden tire, the screws or bolts for fastening the plates to the wheel-rim, and the safety-bolts passing through the plates adjacent to their outer ends, the wooden tire being bored out to permit the tire to yield upon the cushion, substantially as shown and described.

WILLIAM McCAUSLAND.

Witnesses:
MINNIE WOODLE,
CLARENCE SHAW.